US008571915B1

(12) United States Patent
Wong et al.

(10) Patent No.: US 8,571,915 B1
(45) Date of Patent: Oct. 29, 2013

(54) SYSTEM AND METHOD FOR SELECTIVELY ADVANCING ITEMS IN A PICKING SCHEDULE

(75) Inventors: Cherie G. Wong, Seattle, WA (US); Eric Young, Mercer Island, WA (US); Ramon A. Palacios Durazo, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 555 days.

(21) Appl. No.: 12/725,350

(22) Filed: Mar. 16, 2010

(51) Int. Cl.
*G06Q 10/00* (2012.01)
(52) U.S. Cl.
USPC .................................................. 705/7.26
(58) Field of Classification Search
USPC .................................................. 705/7.26
See application file for complete search history.

(56) References Cited

U.S. PATENT DOCUMENTS

| | | | | |
|---|---|---|---|---|
| 5,395,206 | A * | 3/1995 | Cerny, Jr. ...................... | 414/807 |
| 5,875,434 | A * | 2/1999 | Matsuoka et al. .............. | 705/28 |
| 6,061,607 | A * | 5/2000 | Bradley et al. ................ | 700/216 |
| 7,110,855 | B2 * | 9/2006 | Leishman ..................... | 700/216 |
| 7,177,825 | B1 | 2/2007 | Borders et al. | |
| 7,243,001 | B2 | 7/2007 | Janert et al. | |
| 7,941,244 | B2 * | 5/2011 | Somin et al. .................. | 700/216 |

FOREIGN PATENT DOCUMENTS

JP 2008-4053 * 1/2008

OTHER PUBLICATIONS

Aly, Ahmed Hassan, and Ferrell, William, "Order-Picking Path Optimization With Multiple Picks Per Route Using Pallet Stackability Concept in a Warehouse," Proceedings of the 2009 Industrial Engineering Research Conference, 2009, pp. 585-590.*
Dekker, R., De Koster, M.B.M., Roodbergen, K.J., and Van Kalleveen, H., "Improving Order-Picking Response Time at Ankor's Warehouse," Interfaces, 34, 4, Jul./Aug. 2004, pp. 303-313.*
Kempfer, Lisa M., "Picking Fundamentals," Material Handling Management, Jul. 2006, pp. 24 and 26-27.*
Koo, Pyung-Hoi, "The Use of Bucket Brigades in Zone Order Picking Systems," OR Spectrum, 31, 2009, pp. 759-774.*
Manzini, Riccardo, Gamberi, Mauro, and Regattieri, Alberto, "Design and Control of a Flexible Order-Picking System (FOPS): A New Integrated Approach to the Implementation of an Expert System," Journal of Manufacturing Technology Management, 16, 1, 2005, pp. 18-35.*
Martinez, Samuel, an Integrated Stock Assignment Model for a Warehouse Fast Picking Area, University of Missouri-Columbia, Dec. 2008.*

(Continued)

*Primary Examiner* — Nathan Erb
(74) *Attorney, Agent, or Firm* — Robert C. Kowert; Meyertons, Hood, Kivlin, Kowert & Goetzel, P.C.

(57) ABSTRACT

Embodiments of a system and method for selectively advancing items in a picking schedule are described. Embodiments may include a pick scheduler configured to determine that available labor exceeds labor needed to perform a picking process during a time period of a picking schedule. From items not scheduled to be picked during that time period, the pick scheduler may identify candidate items that are candidates to be picked during that time period. Each candidate item may improve a performance metric of the picking process. The pick scheduler may, for each of multiple candidate items, determine that advancing that item to the time period is expected to improve a shipping metric. The pick scheduler may, in response to determining that the expected shipping metric improvement of a particular candidate item is greater than that of other candidate items, generate an instruction to pick the particular candidate item during the time period.

24 Claims, 8 Drawing Sheets

(56) References Cited

OTHER PUBLICATIONS

Petersen, Charles G., Siu, Charles, and Heiser, Daniel R., "Improving Order Picking Performance Utilizing Slotting and Golden Zone Storage," International Journal of Operations & Production Management, 25, 9/10, 2005, pp. 997-1012.*

Renaud, J., and Ruiz, A., "Improving Product Location and Order Picking Activities in a Distribution Centre," Journal of the Operational Research Society, 59, 2008, pp. 1603-1613.*

Schiavo, Brian, "Raising Your Voice—As Well as Productivity," Food Logistics, 103, Apr. 2008, pp. 36 and 38.*

* cited by examiner

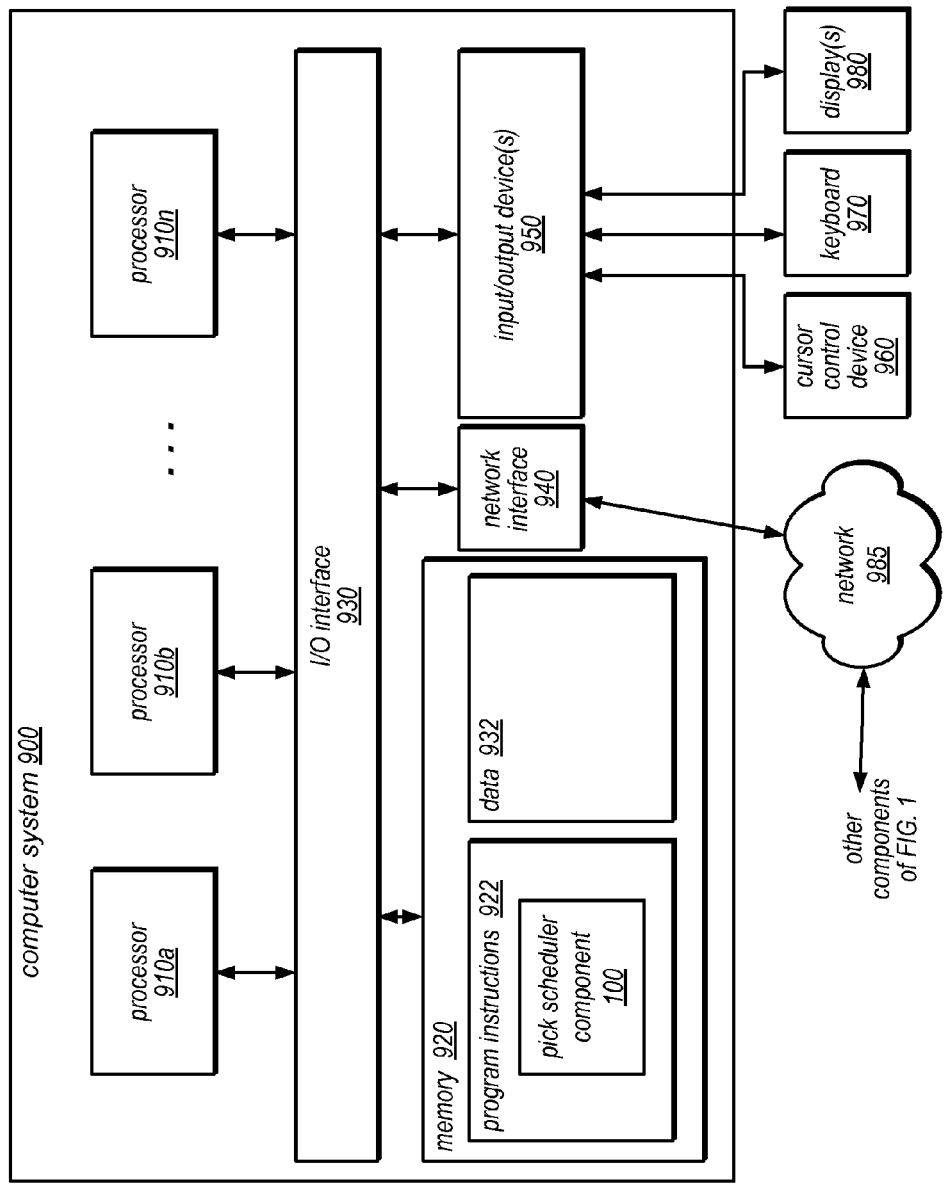

SYSTEM AND METHOD FOR SELECTIVELY ADVANCING ITEMS IN A PICKING SCHEDULE

BACKGROUND

Electronic marketplaces (e.g., Internet- or web-based marketplaces) have become legitimate alternatives to traditional "brick and mortar" retail stores. For instance, consumers may visit a merchant's website to view and/or purchase goods and services offered for sale by the merchant (and/or third party merchants). In many cases, consumers appreciate the convenience and simplicity of the shopping experience provided by electronic marketplaces. For example, a consumer may quickly browse an electronic catalog (e.g., via a web browser) and select one or more items from the catalog for purchase. Such items may be shipped directly to the consumer thereby relieving the consumer of the inconvenience of traveling to a physical store.

In a retail shopping experience, consumers may immediately know the date at which an item will be acquired. For in-stock items, this date may be the same as the date of purchase. For example, a user may visit an electronics retail store to purchase a portable music player. If the portable music player is in-stock, the user may purchase and acquire the player during the same visit. The ability to know when an item will be acquired prior to finalizing a decision to purchase the item can be beneficial to the consumer. For example, a consumer may want to ensure that a gift item is acquired prior to a gift recipient's birthday.

Electronic marketplaces may also provide consumers with information that specifies when an item will be provided to a consumer. For example, an item detail web page provided by a merchant may specify that the respective item can be delivered to the consumer by a certain date if the consumer purchases the item by a certain deadline. For instance, a product detail page may specify that an item may be delivered to a consumer within two days if the consumer purchases the item within the next four hours. Upon purchasing the item, the consumer may also be given estimates of shipping and delivery dates for the item. Consumers may view this type of information as a promise to be fulfilled by the merchant. If such promise is broken (e.g., the item is not shipped or delivered by the estimated dates), the consumer's opinion of the merchant may be negatively impacted, which may decrease the chance that the consumer will patronize the merchant in the future. If the promise is upheld, the consumer may form a favorable opinion of the merchant, which may increase the chance that the consumer will provide the merchant with repeat business.

BRIEF DESCRIPTION OF THE DRAWINGS

FIG. 8 illustrates a computer system suitable for implementing various elements of the system and method for selectively advancing items in a picking schedule.

Figure 1:
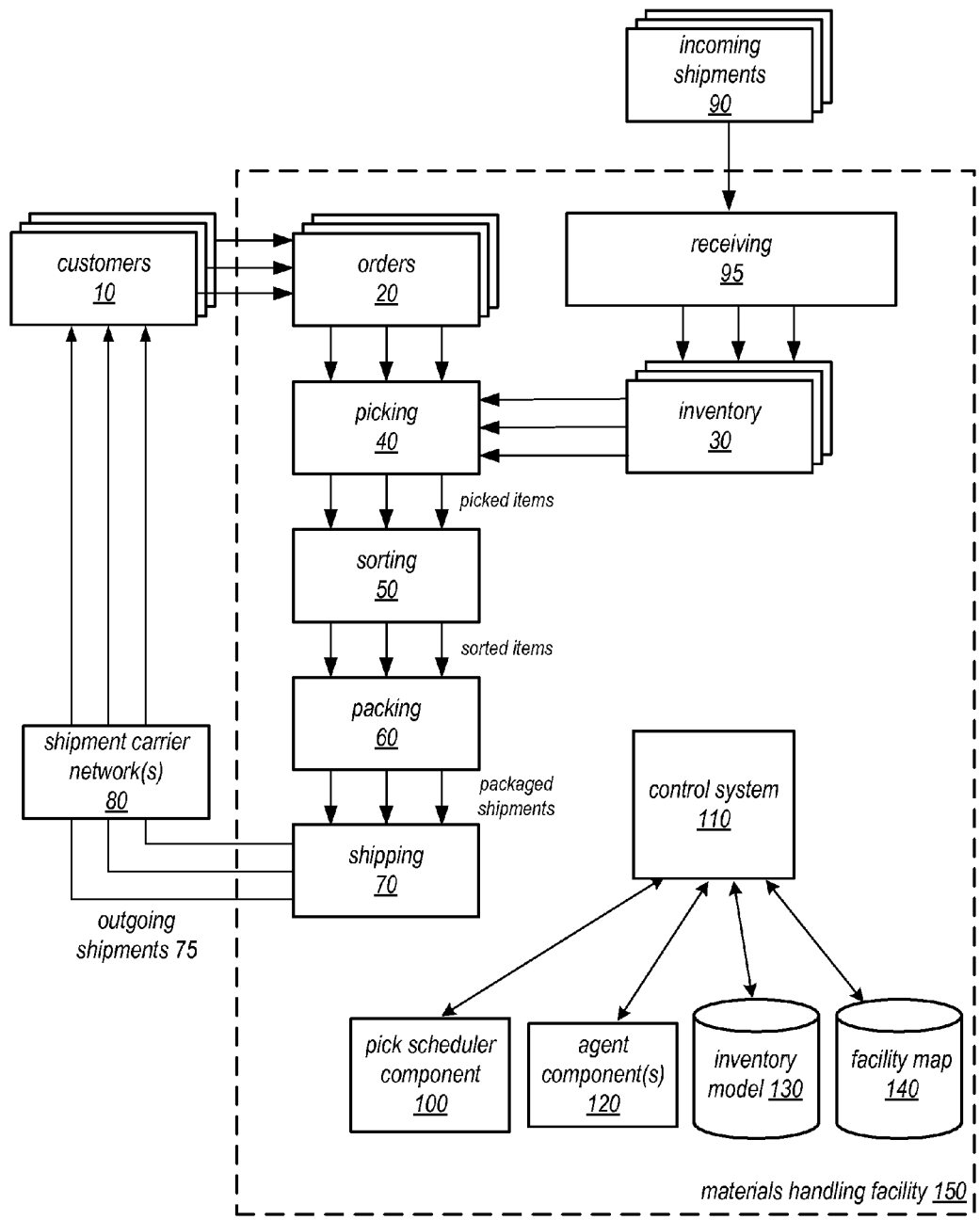
FIG. 1 illustrates a logical representation of a materials handling facility as well as multiple system components, according to some embodiments.

While the system and method for selectively advancing items in a picking schedule is described herein by way of example for several embodiments and illustrative drawings, those skilled in the art will recognize that the system and method for selectively advancing items in a picking schedule is not limited to the embodiments or drawings described. It should be understood, that the drawings and detailed description thereto are not intended to limit the system and method for selectively advancing items in a picking schedule to the particular form disclosed, but on the contrary, the intention is to cover all modifications, equivalents and alternatives falling within the spirit and scope of the system and method for selectively advancing items in a picking schedule as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Introduction

Various embodiments of a system and method for selectively advancing items in a picking schedule are described. In various embodiments, a materials handling facility (e.g., the materials handling facility of FIG. 1) may include various processes for processing items, such as processes for receiving items into inventory, picking items from inventory, preparing items for shipment, and shipping items from the facility. In some embodiments, the materials handling facility may receive orders for items from various customers and utilize the aforesaid processes to fulfill such orders.

Various embodiments may include a pick scheduler component (or simply "pick scheduler") configured to schedule various items for picking according to an item picking process. For example, the materials handling facility may be tasked with fulfilling multiple customer orders, each of which may include one or more items to be shipped as one or more shipments. As described in more detail herein, the pick scheduler component may be configured to assign an expected ship deadline to each item of a shipment. The expected ship deadline may be any temporal indication of when items are expected to be ready for shipment from the materials handling facility. In various embodiments, the pick scheduler may determine an item's expected ship deadline based on one or more criteria including but not limited to shipping and delivery estimates provided to customers, shipping transit times, and/or estimates of processing times within the materials handling facility. Based on the expected ship deadlines of items and the processing capacity of the materials handling facility throughout different portions of a workday, the pick scheduler may schedule different groups of items to be picked during different time periods.

During some time periods, the processing capacity of the materials handling facility may exceed the quantity of work to be performed. For example, to meet shipping commitments, the materials handling facility may need to perform an item picking process to pick 10,000 items from inventory during a given hour. If the quantity of labor available during that hour enables the materials handling facility to process more than 10,000 items, the pick scheduler component may be configured to temporally advance the picking of other items, such as items that were initially scheduled to be picked at a later time or even items that have not yet been scheduled. In various embodiments, temporally advancing the picking of an item may include moving the item from a later time period in the picking schedule to an earlier time period in the picking schedule.

In various embodiments, to identify candidate items that are candidates for advancement in the picking schedule, the pick scheduler may select items based on one or more criteria including but not limited to a given item's impact to the efficiency or performance of the item picking process. For example, the item picking process may be monitored for one or more performance metrics, an example of which may include a measure of pick density (e.g., quantity of items picked per time period or per distance traveled). If a given item is determined to improve a performance metric of the item picking process, the pick scheduler may be configured to designate that item as a candidate item to be temporally advanced in the picking schedule. In one example, items that the pick scheduler determines would improve the pick density metric described above may be designated as candidate items that are candidates to be temporally advanced in the picking schedule. In some embodiments, the pick scheduler may be configured to select which items are candidates to be temporally advanced in the picking schedule based on the degree to which such items, if temporally advanced, would improve a performance metric (e.g., a pick density metric) of the item picking process. For example, in order to be designated as a candidate item, a given item may in some embodiments be required to improve a pick density metric by a requisite quantity.

For some time periods, the quantity of candidate items identified may be greater than the quantity of items that can be processed by the excess processing capacity of the materials handling. In such cases, the picking scheduler may be configured to select particular candidate items from the pool of candidate based on the magnitude with which each item would improve a performance metric of the item picking process. For example, if a first candidate item would (if temporally advanced in the picking schedule) improve a pick density metric by 5% and a second candidate item would (if temporally advanced in the picking schedule) improve the pick density metric by only 1%, the picking scheduler may be configured to determine that the first candidate item should be temporally advanced in the picking schedule whereas the second candidate should not be temporally advanced in the picking schedule.

In yet other cases, two or more candidate items may improve a performance metric of the item picking process by the same amount or a similar amount. In these cases, the pick scheduler may utilize additional criteria to select one or more of the candidate items that are candidates to be temporally advanced in the picking schedule. One additional criterion may include a projection of shipment delivery impact associated with each item. For a given item, shipment delivery impact may indicate whether the given item, if temporally advanced in the picking schedule, would be delivered earlier than initially estimated. If the shipment delivery impact indicates the item would be delivered early, the shipment delivery impact may also specify the extent of such early delivery (e.g., one day early, two days early, etc.).

Consider an example where the pick scheduler determines that two candidate items, a first candidate item and a second candidate item, would improve a performance metric of the item picking process (e.g., a pick density metric) by a similar amount. In this example, if advancing the picking of the first candidate item would result in that item being delivered to a customer a day earlier than planned and advancing the second candidate item would not result in an early delivery, the pick scheduler may be configured to determine that the first candidate item is to be temporally advanced to an earlier picking time period whereas the second candidate item is not. In this example, instead of letting excess labor capacity of the materials handling facility sit idle, the picking scheduler may enable such capacity to be utilized to selectively process items that result in an improved customer experience (e.g., early delivery of an item).

In other cases, different criteria may be utilized to differentiate between items that are candidates to be temporally advanced in the picking schedule. One example of such criteria includes shipping cost savings criteria. Consider an example where the pick scheduler determines that two candidate items, a first candidate item and a second candidate item, would improve a performance metric of the item picking process (e.g., a pick density metric) by a similar amount. In this example, if advancing the picking of the first candidate item would result in a shipping cost savings (e.g., by downgrading from a two-day ship method to a less costly three-day ship method while still meeting the initial estimated delivery time for that item) and advancing the second candidate item would not result in a shipping cost savings (or would result in a smaller cost savings relative to that of the first item), the pick scheduler may be configured to determine that the first candidate item is to be temporally advanced to an earlier picking time period whereas the second candidate item is not. In this example, instead of letting excess labor capacity of the materials handling facility sit idle, the picking scheduler enables such capacity to be utilized to selectively process items that result in decreased shipping costs associated with the materials handling facility.

As described in more detail below, in some cases, the pick scheduler may even determine that a performance degradation of the item picking process is to be incurred in order to improve the customer experience (e.g., via early shipment delivery) or in order to acquire a shipping cost savings (e.g., a cost savings that would likely outweigh the performance degradation). In yet other cases, situations may arise in which the available labor for a given time period is not sufficient to process all items scheduled to be picked during that time period. In these cases, the pick scheduler described herein may be configured to utilize logic similar to that described above in order to determine which items should remain on schedule and which items should be pushed to a later time period. These and other variations are described in more detail below.

Materials Handling Facility

FIG. 1 illustrates a logical representation or view of the operation of a materials handling facility 150 in which embodiments of the system and method for selectively advancing items in a picking schedule may be implemented. In various embodiments, a materials handling facility may include one or more facilities that process, store, and/or distribute units of items including but not limited to warehouses, distribution centers, hubs, fulfillment centers, nodes in a supply chain network, shipping facilities, stock storage facilities, or any other facility configured to process units of items. For example, this figure may illustrate an order fulfillment center of a product distributor. Multiple customers 10 may submit orders 20 to the product distributor, where each order 20 specifies one or more units from inventory 30 to be shipped to the customer that submitted the order. To fulfill the customer orders 20, the one or more units specified in each order may be retrieved, or picked, from inventory 30 (which may also be referred to as stock storage) in the materials handling facility according to an item picking process, as indicated at 40. Picked units may be delivered or conveyed, if necessary, to one or more stations in the materials handling facility for sorting 50 into their respective orders, packing 60, and finally shipping 70 to the customers 10. In various embodiments, picked units may be delivered to a station where individual units of items are associated with and placed into particular conveyance receptacles, which are then inducted into a conveyance mechanism. The conveyance receptacles may then be routed to particular destinations for the items contained within the receptacles in accordance with the requests (orders) currently being processed, e.g. to sorting stations, under direction of a control system (e.g., control system 110). A picked, packed and shipped order does not necessarily include all of the items ordered by the customer; an outgoing shipment (e.g., outgoing shipments 75) to a customer may include only a subset of the ordered items available to ship at one time from the materials handling facility.

Outgoing shipments 75 may be acquired by one or more shipment carriers that process the shipments in a respective shipment carrier network 80. A given shipment carrier network 80 may include multiple facilities or hubs where shipments may be sorted and forwarded on to other facilities or hubs and ultimately delivered to the shipment destination (e.g., a residence of a customer 10 or other designated location). Shipments distributed within a given shipment carrier network may be conveyed via any of a variety of transportation methods including but not limited to ground (e.g., truck) and air (e.g., plane).

A materials handling facility may also include a receiving 95 operation for receiving incoming shipments 90 of stock (e.g., units of inventory items) from one or more sources (e.g., vendors) and for placing the received stock into stock storage (e.g., inventory 30). The receiving 95 operation may also receive and process returned purchased or rented items or orders from customers. At least some of these items are typically returned to inventory 30. The various operations of a materials handling facility may be located in one building or facility, or alternatively may be spread or subdivided across two or more buildings or facilities.

Example Picking Process

Figure 2:
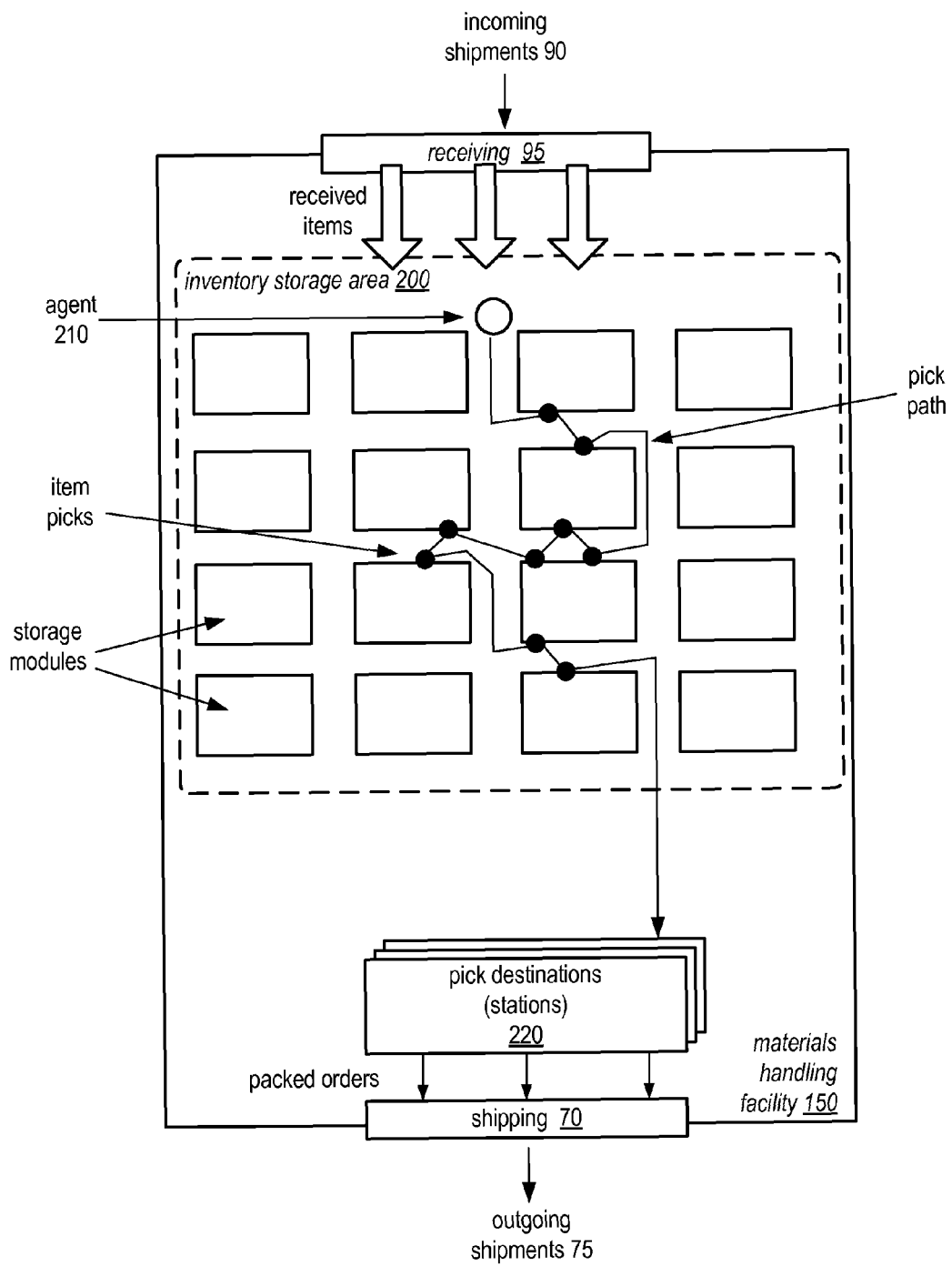
FIG. 2 illustrates an example picking process for picking items from an inventory storage area of a materials handling facility, according to some embodiments.

FIG. 2 illustrates an example picking process within a materials handling facility according to various embodiments. As described above, a materials handling facility may include one or more receiving 95 operations for receiving shipments 90 of stock from various vendors. For example, an order procurement system may issue purchase orders for various items to one or more vendors in order to replenish inventory 30, which may be stored within inventory storage area 200. Units of ordered items may arrive at receiving 95 as incoming shipments 90 delivered by a shipment carrier. In other cases, incoming shipments 90 may represent items transferred from another materials handling facility or another node (e.g., warehouse, materials handling facility, etc.) in the fulfillment network of the distributor that owns and/or controls materials handling facility 150. Received items may be stowed into inventory storage. As used herein, the term stowing may include the process of moving a unit into an identifiable location within inventory storage area 200. In a stow process, units may be sourced from a variety of location including but not limited to a designated receiving area of the materials handling facility (e.g., a receiving dock, receiving lanes near a receiving dock, etc.). In some cases, agents in the materials handling facility may place received units at an intermediate location (e.g., a drop zone) within inventory storage area 200. In these cases, agents performing a stowing process may source units from such intermediate locations.

In various embodiments, inventory storage area 200 may include multiple locations with varying levels of granularity. As illustrated, in some embodiments, inventory storage area 200 may include multiple storage modules (e.g., shelving units or some other type of storage unit) that each include multiple distinct areas (e.g., multiple shelves). In some cases, each of such areas may be further divided into distinct locations (e.g., different slots on a shelf), each of which may represent an identifiable portion of inventory storage area 200. In other cases, dividing inventory storage area 200 into multiple identifiable inventory locations may be implemented in other manners. In some cases, an identifiable location of inventory storage area 200 may be referred to as a particular bin (e.g., a slot, container, or other defined area) of multiple bins in inventory storage area 200. In various embodiments, the inventory model 130 described herein may include a record of each location within inventory storage area 200 and each respective unit stored at that location. For instance, for each bin of multiple bins in inventory storage area 200, inventory model 130 may specify one or more units of items stored in that bin.

In the illustrated embodiment, agent 210 is performing an example item picking process. The agent may utilize a receptacle cart (not illustrated) including one or more receptacles in which to store picked items. In various embodiments, the pick process performed by agent 220 may be performed in accordance with one or more pick lists (e.g., lists that may specify units to be picked and the inventory locations of such units). In various embodiments pick lists may be generated pick scheduler 100. A generated pick list may be provided to control system 110, which may provide the pick list to an agent 210's respective agent component 120. Agent 210 may view one or more portions of the pick list on his respective agent component 120 (e.g., a mobile or handheld communication device, which may include any type of computer system or electronic device). Agent 210 may pick units from the inventory locations indicated by the pick list. In the illustrated embodiment, an instance of a pick at an inventory location is denoted by a darkened circle within inventory storage area 200. In various embodiments, agent 210 may provide picked units to one or more pick destinations 230, which may include stations for performing any of the processes described above, such as sorting 50 and packing 60. Packed orders may be provided to shipping 70 to be shipped as outgoing shipments 75.

Note that the illustrated embodiment contains only a single agent for clarity of illustration. It should be understood that any number of agents may be performing item picking processes in various embodiments.

System Components

Returning to FIG. 1, in addition to control system 110, the materials handling facility may also include a pick scheduler component 100 configured to control item picking processes in the materials handling facility 150, such as picking 40.

While pick scheduler component 100 is illustrated separately from control system 110, the pick scheduler component may be a component of the control system in some embodiments. The control system and/or the pick scheduler component may be configured to communicate with one or more agent components 120, a data store including an inventory model 130, and a data store including a facility map 140, each of which are described in more detail below. In various embodiments, pick scheduler component 100 and the other elements mentioned above may be implemented within materials handling facility 150 or remotely within another facility not illustrated.

In various embodiments, agent component(s) 120 may be computer systems or other electronic devices that may be associated with agents performing work within the materials handling facility. In various embodiments, agent components 120 may be mobile or handheld devices that are carried by agents within the materials handling facility. Agent components 120 may communicate with control system 110 to send and receive information or commands, as described in more detail below. In various embodiments, units within the materials handling facility may include or may be labeled with one or more identifiers (e.g., barcodes, stock keeping units or "SKUs", etc.). These identifiers may be specific to a particular item type (e.g., a particular model of a digital music player) or specific to a particular unit of that item type (e.g., a particular unit of that digital music player). Agent components may be configured to read (or "scan") these identifiers utilizing various components including but not limited to optical scanners (e.g., to scan barcode identifiers) or radio frequency identifier (RFID) scanners.

In various embodiments, control system 110 may track inventory based on input from one or more of agent component(s) 120. For instance, as agents move units from one location to another location (during stowing, picking, or some other operation), such movements may be recorded with agent components 120 utilized by the agents. For instance, as an agent moves an item from a first location to a second location, an agent may scan the item out of the first location by scanning the first location and the unit and/or may scan the item into the second location by scanning the second location and the unit. Such scanning may include electronically obtaining an identifier for the unit and the location from where the unit is being taken or the location to which the unit is being moved. (In some cases, the location from which a unit is removed need not be scanned. Instead, the control system may determine or infer the location from which a unit is removed based on the unit's last known location as recorded by the control system in inventory model 130.) For example, such scanning may include obtaining an identifier via an optical scanner (e.g., bar code scanner) or RFID scanner. In response, the control system may generate a stored data record (e.g., a record in inventory model 130) indicating the unit has left the corresponding location. A similar process may be performed when placing the unit at its new location. For example, an agent may scan an item and scan the location to which that item is being placed (e.g., a location or bin in stock storage). In a similar manner as that described above, the control system may generate a stored data record indicating the unit has arrived at the new location (e.g., a record in inventory model 130). In this manner, control system 110 may in various embodiments track the location of a given unit throughout that unit's entire lifecycle in the materials handling facility (e.g., from receiving 95 to shipping 70).

In some cases, control system 110 may utilize automated devices or systems to track inventory within the materials handling facility. For instance, as units move from one location to another within the materials handling facility (e.g., on a conveyance mechanism or cart), automated devices, such as optical or RFID scanners controlled by a computer system, may electronically obtain identifiers of units during such movement (e.g., by scanning an optical identifier or RFID tag). Such information may be collected by control system 110 and/or an inventory management component in order to track inventory units within the materials handling facility.

As described above, control system 110 may track the locations of inventory items with the materials handling facility (with or without the assistance of agent components 120). These locations may be recorded in inventory model 130, which may include a virtual representation of inventory of the materials handling facility stored within memory of a data store. In various embodiments, such a data store may be configured as a database, as one or more mass storage devices (e.g., physical disks, logical volumes, etc.) configured to store data blocks or files, or in any other suitable configuration for data storage. The inventory model may be configured to indicate the inventory units within the materials handling facility as well as the respective locations of such units. These locations may be any location within the materials handling facility. In some embodiments, one or more item locations may be a particular bin of a storage module. An example storage module might be a shelving unit and a particular bin might be a slot on one of the shelves of the shelving unit (e.g., each shelf might be subdivided into multiple bins using shelf dividers). In various embodiments, bins may include multiple units, which may be homogeneous (e.g., a bin that includes units of the same item) or heterogeneous (e.g., a bin that includes at least some units of different items). Note that bins are just one example of an inventory location; in various embodiments, other types of designations may be used for inventory locations. For instance, the materials handling facility may in some embodiments be mapped with a two or three dimensional coordinate system, and the locations of inventory units may be specified by coordinates of such a coordinate system.

In addition to being capable of tracking the locations of various inventory items within the materials handling facility, the control system may collect data utilized to construct facility map 140. In some embodiments, facility map 140 may be generated and/or maintained by the control system. In other cases, some other component or computer system may be responsible for generating and/or maintaining the facility map. In various embodiments, facility map 140 may indicate, for any two locations within the materials handling facility, the distance between such locations. Note that the distance between any two locations (e.g., two separate inventory bin locations) may be specified in terms of physical distance (e.g., distance between two bins measured in meters) or a temporal distance (e.g., a historical average of the travel time to traverse a path between two bins).

Pick scheduler 100 may be configured to perform a variety of functions including controlling or directing the item picking process(es) within the materials handling facility. In various embodiments, the pick scheduler may be configured to generate expected ship deadlines for each item needed to fulfill an order, generate a pick schedule based on such deadlines, and generate pick instructions for one or more agents based on such schedule. In various embodiments, the pick scheduler may be configured to provide the pick instructions to agents within the materials handling facility via each agent's respective agent component 120 (e.g., a handheld or mobile device). In some cases, these instructions may be structured as pick lists that specify items to pick, respective locations of such items (e.g., bin locations), and an order in which to pick the items. In various embodiments, pick lists on an agent component may be updated dynamically (e.g., updated in real-time). Additional details of the pick scheduler's operation are described in more detail below with respect to FIGS. 3-6.

Generating a Pick Schedule and Pick Instructions

Figure 3:
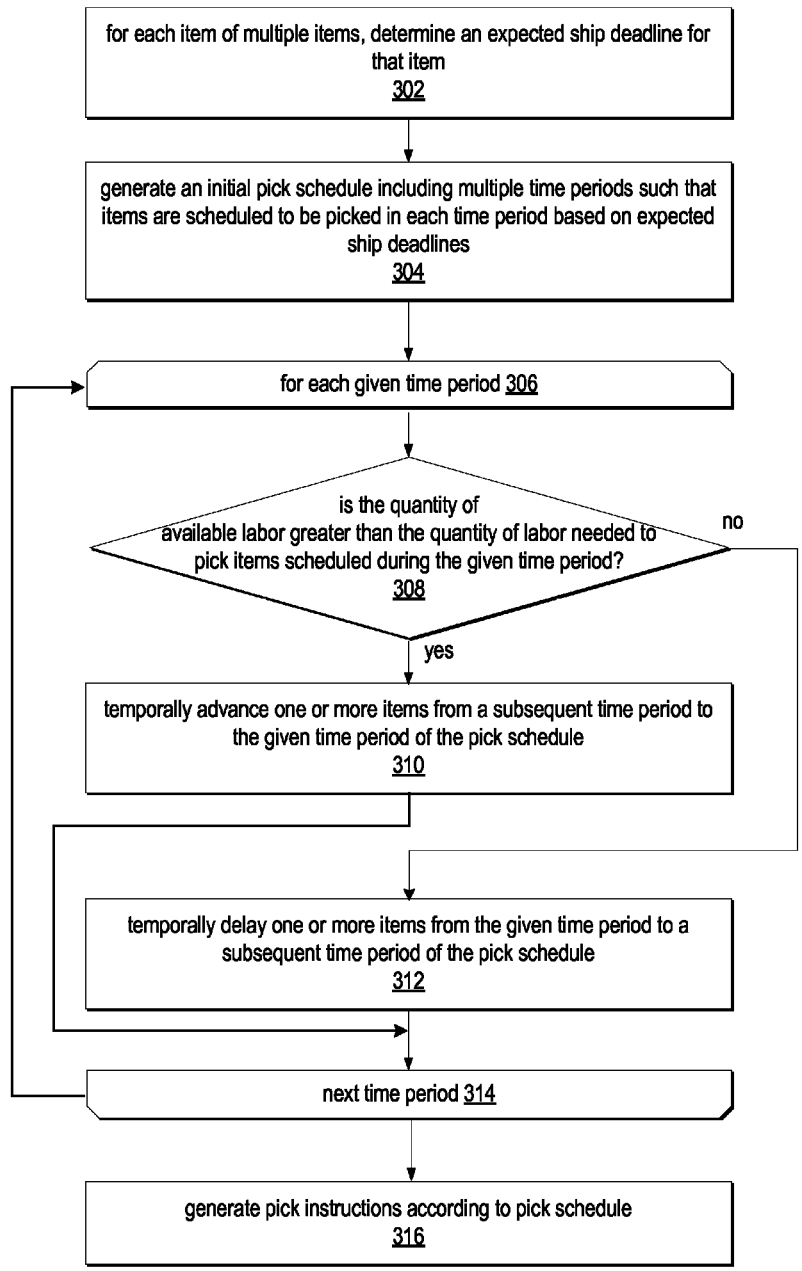
FIG. 3 illustrates a flowchart of an example method for advancing or delaying items in an item picking schedule and generating pick instructions according to such schedule, according to some embodiments.

Pick scheduler component 100 may be configured to perform various methods to generate a pick schedule and pick instructions. One example of such a method is illustrated in FIG. 3. Note that while the elements of FIG. 3 are described as being performed by pick scheduler 100, the method may in some embodiments be performed by other components or computer systems.

As, illustrated by block 302, the pick scheduler may generate an expected ship deadline for each of multiple items, such as the items specified by the orders 20 (FIG. 1) assigned to the materials handling facility. The expected ship deadline may be any temporal indication of when items are expected to be ready for shipment from the materials handling facility. In various embodiments, an item's expected ship deadline may be generated based on a variety of data including but not limited to expected delivery dates, expected ship dates, a facility's minimum processing time, a facility's maximum processing time, and/or shipment carrier "pull" schedules. Each of such items is described in more detail below. The manner in which the pick scheduler may utilize such items to generate expected ship deadlines is also described in more detail below.

In various embodiments, each order 20 (and by extension, each item of each order) may be assigned an expected delivery date and/or an expected ship date. An item's expected delivery date may indicate a date and/or time by which the item is expected to be delivered to the shipment destination of the order (e.g., a customer's residence). An item's expected ship date may indicate a date and/or time by which the item is expected to be shipped from a materials handling facility. In some embodiments, the expected delivery date and/or the expected ship date of a shipment may be at least partially dependent on the shipment method specified at order time. In various embodiments, the expected delivery date and/or expected ship date may be provided to a customer at the time of order. Such dates may be utilized to generate an expected ship deadline as described in more detail below.

In various embodiments, materials handling facility 150 may be associated with a minimum processing time and a maximum processing time, each of which may be configurable. In various embodiments, the minimum processing time may specify the minimum amount of time needed by the materials handling facility in order to prepare an item for shipment. For example, due to processing constraints of the materials handling facility, the facility may require the minimum processing time be at least one hour. Of course, other minimum processing times could be utilized in various embodiments. In some cases, the minimum processing time may be based on the historical performance of the particular materials handling facility. In various embodiments, the maximum processing time may specify the maximum quantity of time that the materials handling facility is permitted to spend preparing an item for shipment. This value may also be configurable. The minimum processing time and/or maximum processing time may be utilized to generate an expected ship deadline as described in more detail below.

In various embodiments, an item's expected ship deadline may also depend on a shipment carrier's pull schedule. As used herein, the phrase "carrier pull" or simply "pull" may refer to an instance of a shipment carrier vehicle acquiring one or more shipments from the materials handling facility. A carrier pull may be scheduled at various times throughout a given workday. Additionally, some carriers may have only one pull per day whereas other carriers may have two or more pulls per day.

To determine an expected ship date for an item, the pick scheduler component may be configured to first determine a range of time in which the expected ship date will fall. In various embodiments, pick scheduler component 100 may be configured to determine the lower bound of this range as being equivalent to the sum of the time at which the order was assigned to the materials handling facility and the minimum processing time described above. The pick scheduler component may be configured to determine the upper bound of the range as being equivalent to the expected ship date described above or equivalent to the sum of the time at which the order was assigned to the materials handling facility and the maximum processing time described above, whichever is earlier.

Once the range of time is established as described above, the pick scheduler component may be configured to determine the available carrier pulls during that time range. If there is only one carrier pull scheduled, the pick scheduler may determine the item's expected ship deadline as being equivalent to the time at which that carrier pull is scheduled to occur. If there are multiple carrier pulls scheduled, the pick scheduler may determine the item's expected ship deadline as being equivalent to the time at which the latest carrier pull is scheduled to occur. In any of these cases, the expected ship deadline may be adjusted by a tolerance window to ensure that the item's shipment is prepared before the selected carrier pull. For example, the pick scheduler may enforce a rule that requires shipments to be ready for shipment 15 minutes prior to a carrier pull. Other variations are possible and contemplated. Note that in various embodiments different shipments may be associated with different shipment methods and different carrier pulls may be associated with different shipment methods (e.g., ground, air, express, overnight, 2-day, 3-day, etc.). For a given shipment, the picking scheduler may in various embodiments be configured to constrain the above-described analysis to carrier pulls corresponding to the shipment method(s) designated for that shipment.

As illustrated by block 304, the pick scheduler component may generate an initial pick schedule including multiple time periods, each of which may include multiple items to be picked. In various embodiments, a given item may be scheduled within a respective time period based on that item's expected ship deadline (described above). For example, if the initial pick schedule is organized into one hour time windows, an item with a 1:30 P.M. expected ship deadline might be scheduled to be picked during a 12:00 PM-1:00 PM time period. In various embodiments, an item may be scheduled to be picked during a time period that precedes the expected ship deadline in order to allow for processing time within the materials handling facility. For example, after an item is picked, it may need to be processed by various stations (e.g., sorting, gift wrapping, or packing stations) prior to shipping, such as described above with respect to FIG. 2.

In various embodiments, the scheduling techniques described herein may be applied to each of multiple items, such as all items having an expected ship deadline falling within the same workday. Table 1 illustrates one non-limiting example of a pick schedule. The left column of Table 1 indicates multiple time periods during which items are to be picked. The right column indicates items that are to be picked within each respective time period. Items of a given row may correspond to the picking time period of that same row. Note that Table 1 is merely one example of pick schedule according to one embodiment. Various other formats for a pick schedule are possible and contemplated. In various embodiments, pick schedules generated by pick scheduler component 100 may be stored in a computer-readable format within memory of the pick scheduler or elsewhere.

TABLE 1

Example Pick Schedule

| Picking Time Period | Items to be Picked |
|---|---|
| 2:00 PM-3:00 PM | Item A, Item B, Item C . . . |
| 3:00 PM-4:00 PM | Item L, Item M, Item N . . . |
| 4:00 PM-5:00 PM | Item X, Item Y, Item Z . . . |

As illustrated by blocks 306 and 314, the portions of the method corresponding to blocks 308-312 may be repeated for each time period of the schedule. In some embodiments, the pick scheduler component may perform these portions of the method beginning with the earliest time period of the picking scheduled and progress in chronological order to the last picking time period of the picking schedule.

As illustrated by block 308, the pick scheduler may evaluate the given time period to determine whether the quantity of available labor for that time period is greater than the quantity of labor needed to pick the items scheduled to be picked during the given time period. In one example, this may include determining an aggregate processing rate of the agents (e.g., pickers) staffed during the given time period. This aggregate processing rate may be determined by summing the individual processing rates of the various agents. The aggregate processing rate may be multiplied by the length of the given time period to determine the quantity of work that the aggregate labor can perform during that time period. For example, if 100 agents can collectively pick 15,000 items per hour and the given time period is one hour, the quantity of work that the agents can collectively perform during the given time period is 15,000 picked units (e.g., 15,000 items per hour multiplied by one hour). This value can be compared to the total quantity of items scheduled during the given time period. If the quantity of items that the aggregate labor can pick during the given time period is greater than the quantity of items initially scheduled during that time period, the pick scheduler may determine that the quantity of available labor for the given time period is greater than the quantity of labor needed to pick the items scheduled to be picked during the given time period (in which case, the method would proceed to block 310). If the quantity of items that the aggregate labor can pick during the given time period is not greater than the quantity of items initially scheduled during that time period, the pick scheduler may determine that the quantity of available labor for the given time period is not greater than the quantity of labor needed to pick the items scheduled to be picked during the given time period (in which case, the method would proceed to block 312).

At block 310, the pick scheduler may temporally advance one or more items from a subsequent time period to the current time period. In various embodiments, this may be performed to efficiently utilize the extra capacity (e.g., labor resources) available during the given time period. Referring to Table 1 as one example, if the given time period being evaluated is 2:00 P.M.-3:00 P.M., the pick scheduler may temporally advance the picking of "Item M" from the 3:00 P.M.-4:00 P.M picking time period to the 2:00 P.M.-3:00 P.M. time period. The pick scheduler may utilize a variety of techniques to select which items should actually be temporally advanced, according to various embodiments. In some cases, the selection of the particular items to advance may be dependent on each item's impact to the performance of the item picking process, the impact to the customer (e.g., impact to delivery time), and/or impact to shipping or transportation costs. Examples of such methods are described below with respect to FIGS. 4-6.

At block 312, the pick scheduler may temporally delay one or more items from the given time period to a subsequent time period of the pick schedule. In various embodiments, this may be performed in response to determining that the quantity of available labor is not sufficient to process all items initially scheduled during the given time period (e.g., as described above with respect to block 308). Techniques for determining which items should be temporally delayed in the picking scheduler are described in more detail below.

While not illustrated, there may in some embodiments be instances in which the quantity of available labor is just sufficient to pick the items scheduled during the given time period. In these instance, the method may include leaving the schedule as is for the given time period, which may mean that items are neither temporally advanced to the given time period nor are items from the given time period temporally delayed to a subsequent time period.

As illustrated by block 316, the method may include the pick scheduler generating pick instructions according to the generated pick schedule, which may include any of the pick schedule modifications described above (e.g., temporal advancement or delay of various items). In various embodiments, generating pick instructions may include the pick scheduler component evaluating the pool of items that are scheduled to be picked during a given time period and assigning different groups of items to respective agents (or other labor resources) of the materials handling facility. Each agent may pick the items of his assigned item group similar to the techniques utilized by agent 210 of FIG. 2.

In various embodiments, a given agent's assigned items may be indicated to that agent via a pick list generated by the pick scheduler. Each pick list may specify multiple units (and associated inventory locations) to be picked by an agent of the materials handling facility. In various embodiments, pick lists may also specify an order in which units are to be picked. This ordering may in some cases be generated by the pick scheduler component such that an agent is instructed to traverse a particular pick path (or simply "path") when picking items from inventory. In some cases, pick paths may be generated to maximize efficiency of an agent's movement through the materials handling facility. For instance, pick lists may avoid directing an agent to geographically diverse locations of the materials handling facility (e.g., different floors within the facility) during the same pick session. In some embodiments, pick lists may be generated to maximize pick density (e.g., quantity of picks per unit of time or quantity of picks per unit of distance traveled by an agent). For instance, a pick list that instructs an agent to pick items that are relatively close to each other may provide a higher pick density than a pick list that instructs an agent to pick items that are located in locations of the materials handling facility that are separated by large distances and/or travel times. In various embodiments, to determine distances and/or travel times between two items, the pick scheduler may determine the locations of such items from inventory model 130 and query facility map 140 for the corresponding distance or travel time between such items.

Selectively Advancing Items in the Picking Schedule

Figure 4:
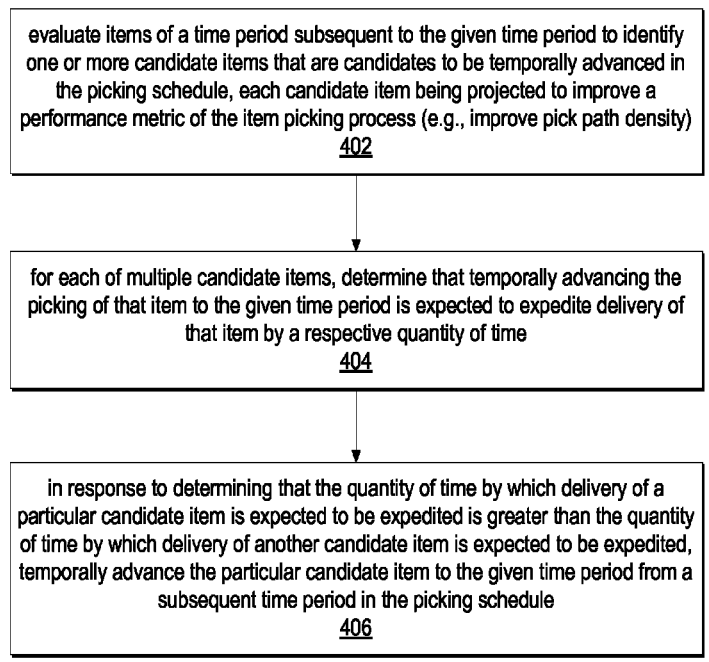
FIG. 4 illustrates a flowchart of an example method for selectively advancing items in an item picking schedule, according to some embodiments.

FIG. 4 illustrates a flowchart of an example method for determining which items should be temporally advanced in the pick schedule. In various embodiments, the illustrated method may be one technique for implementing block 310 described above. Note that the description of FIG. 4 is provided within the context of FIG. 3. More specifically, references to the given time period may refer to whichever time period of the picking schedule is currently being evaluated in blocks 306-314. As described above, the time periods of the picking schedule may be evaluated in chronological order, from earliest to last, in various embodiments. While the illustrated method is described as being performed by the pick scheduling component described herein, the method may be implemented by other components or devices in various embodiments.

As illustrated by block 402, the method may include the pick scheduler evaluating items of a time period subsequent to the given time period to identify one or more candidate items that are candidates to be temporally advanced in the picking schedule. For example, in reference to Table 1, if the 2:00 P.M.-3:00 P.M. time period were the given time period, the pick scheduler may evaluate items of the 3:00 P.M.-4:00 P.M. time period to identify candidate items to advance in the picking schedule. In various embodiments, the method may include determining that an item is a candidate item in response to determining that the item is projected to improve a performance metric of the item picking process.

Figure 5:
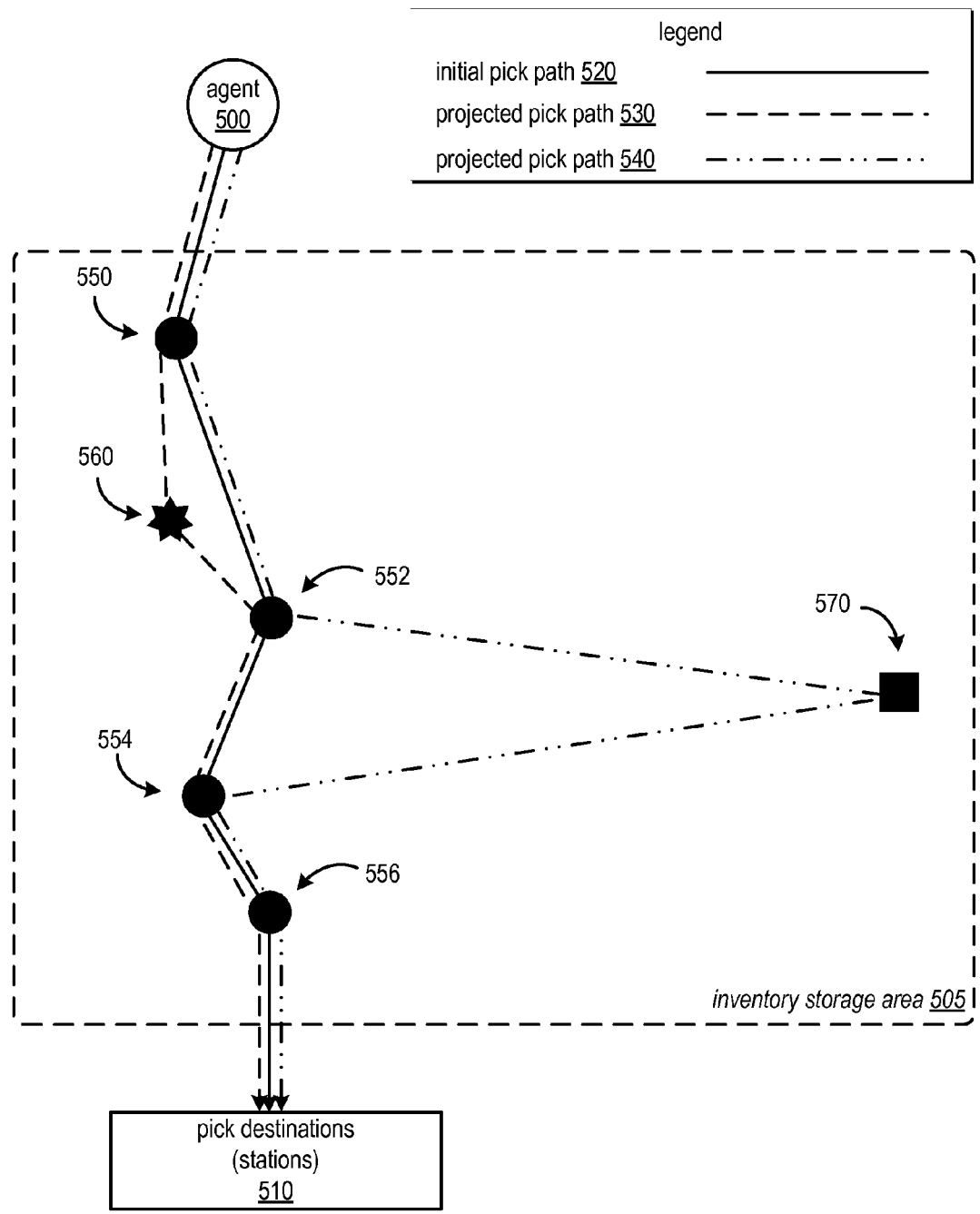
FIG. 5 illustrates a block diagram of example pick paths that may be evaluated by a pick scheduler component, according to some embodiments.

One example of a performance metric may be referred to as pick path density metric or pick density metric. As described above, the pick scheduler may be configured to assign pick paths of items to different agents within the fulfillment center. For instance, for items of a given time period (e.g., the 2:00 P.M.-3:00 P.M. time period of Table 1), the pick scheduler may be configured to assign the picking of different groups of such items to agents of the materials handling facility. Each agent's group of items may be provided as a "pick path" that indicates the group of items to be picked, the locations from which to pick such items (e.g., bin locations in stock storage), and/or an order in which to pick such items. One example of a pick path is illustrated in FIG. 5, which illustrates a logical representation of multiple, possible pick paths. FIG. 5 is described collectively with FIG. 4.

In the illustrated embodiment of FIG. 5, initial pick path 520 illustrates an initial pick path that could be assigned to agent 500. Initial pick path 520 may be one of multiple initial pick paths created by the pick scheduler component. For clarity of illustration, FIG. 5 includes only one initial pick path and two projected pick paths based on that initial pick path. It should be understood that any number of initial pick paths may be evaluated according to the techniques described herein in various embodiments. Each darkened circle 550-556 on initial pick path 520 may represent an item that is to be picked from a location within inventory storage area 505 (similar to inventory storage area 205 described above) and conveyed to pick destinations 510 (similar to pick destinations 220 described above). As described in more detail below, projected pick paths 530 and 540 are variations of initial pick path 520. Each projected pick path includes all the items of the initial pick path and an additional item (e.g., item 560, denoted by a darkened star, or item 570, denoted by a darkened square).

As described above, an example of a performance metric of the item picking process may include a pick density metric (or simply "pick density"). To determine the pick density for initial pick path 520, the pick scheduler component may be configured to determine a ratio of the quantity of items picked on the path to the length of the path. The length may be measured in units of time or units of distance. For instance, an example pick path density could be represented in items picked per hour or items picked per meter.

Returning to block 402 of FIG. 4, the pick scheduler may determine that an item is a candidate item to be temporally advanced in the picking schedule in response to determining that the item is expected or projected to improve a performance metric of the item picking process. In FIG. 5, pick path 520 (and its associated pick path density) may be utilized as the baseline for comparison, as described in more detail below. For instance, consider an example where items 560 and 570 are being evaluated by the pick scheduler to determine if they are to be designated as candidate items to be advanced in the picking schedule. Note that items 560 and 570 may be items from a subsequent time period of the picking schedule relative to the given time period that includes items 550-556. To evaluate item 560, the pick scheduler may determine a pick density associated with a projected pick path 530 that includes the items of the given time period (e.g., items 550-556) as well as item 560. If this pick path density is greater than the pick path density associated with the initial pick path 520, the pick scheduler may determine that item 560 should be designated as a candidate to be temporally advanced in the picking schedule. Similar logic may be performed for item 570 and projected pick path 540. As should be apparent from the illustrated embodiment, projected pick path 530 results in an improved (i.e., higher) pick path density relative to initial pick path 520 and projected pick path 540 results in a worse (e.g., lower) pick path density relative to initial pick path 520. Accordingly, in this example, the pick scheduler may determine that item 560 is a candidate to be temporally advanced in the pick schedule whereas item 570 is not a candidate. While in the illustrated embodiment, only two items (e.g., items 560 and 570) are evaluated, any number of items may be evaluated in various embodiments. In many cases, the pick scheduler may determine that multiple items are candidates to be temporally advanced in the picking schedule.

In various embodiments, there may be multiple items, such as item 560, that would improve a pick path density (or other performance metric) of the item picking process. However, in some cases, the quantity of available labor may not be sufficient to process all of such items. Accordingly, the pick scheduler may be configured to selectively choose which candidate items will actually be temporally advanced to the given time period and which items will remain scheduled during a subsequent time period. As illustrated by block 404, the method may include the pick scheduler, for each of multiple candidate items, determining that advancing the picking of that item to the given time period is expected to expedite delivery of that item by a respective quantity of time. As illustrated by block 406, the method may also include, in response to determining that the quantity of time by which delivery of a particular candidate items is expected to be expedited is greater than the quantity of time by which delivery of another candidate item is expected to be expedited, temporally advancing the particular candidate item to the given time period from a subsequent time period in the picking schedule. This may be useful in situations where the materials handling facility does not have capacity (e.g., labor resources) to process all of the candidate items. By temporally advancing items that result in expedited delivery, the pick scheduler may improve the customer experience for customers that have purchased items processed by the materials handling facility (e.g., customers may generally prefer to receive purchased items sooner rather than later). By utilizing the techniques described herein, various embodiments may reduce the average time between the moment that a customer orders an item to the moment that item is delivered to the customer.

For example, advancing the picking of an item may result in that item being available to be pulled by a shipment carrier at an earlier time, which may ultimately result in that item being delivered to a customer at an earlier date or time. Note that some carrier pulls may result in advancing the delivery of a shipment whereas other pulls may not. In one example, a carrier may have multiple pulls per day from the materials handling facility; each of such pulls may result in immediate injection of the respective shipments into that carrier's shipment network. In this example, advancing the picking of an item may advance the time at which such item is pulled by a carrier from the materials handling facility, which may eventually result in an earlier arrival of the shipment at the respective shipment destination (e.g., a customer's residence). For example, due to the configuration of the shipment carrier's network, a ground shipment acquired by a shipment carrier during a morning pull may arrive at the respective shipment destination one day earlier relative to when the shipment would have arrived at the respective shipment destination had the ground shipment been acquired by a shipment carrier during an evening pull. In other examples, other carriers may have multiple pulls per day, each of which may result in the same delivery time. For instance, a shipment carrier may periodically pull shipments from the materials handling facility throughout a workday and store the shipments at a carrier facility before conveying the shipments through the shipment carrier network. In this particular example, irrespective of whether a ground shipment was acquired during a morning pull or an evening pull, the shipment would arrive at the respective destination at the same time. In another example, a shipment carrier may have only one pull in a given workday (e.g., an evening pull) and advancing the picking of an item for that carrier may not result in any difference to the ultimate delivery time of the item.

Consider an example where two items are determined to be candidate items (e.g., both items, if picked earlier, would improve a pick density metric of the picking process). One example of such an item includes item 560 of FIG. 5. The pick scheduler may determine whether temporally advancing the picking of each item would improve the delivery time of the respective shipment containing such item. If temporally advancing the first item in the picking schedule would result in a one-day early delivery of the item whereas temporally advancing the second item would not result in early delivery of that item, the pick scheduler may determine that the first item should be temporally advanced in the picking schedule. In cases where the capacity (e.g., available labor) of the materials handling facility is capable of processing both of the candidate items, the pick scheduler may forgo the above-described analysis and instead temporally advance the picking of both items, in some embodiments.

Figure 6:
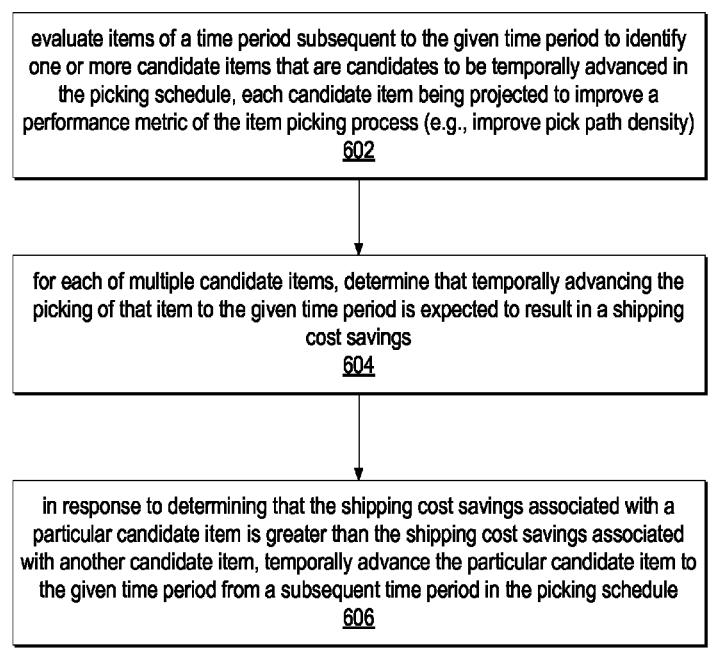
FIG. 6 illustrates a flowchart of another example method for selectively advancing items in an item picking schedule, according to some embodiments.

FIG. 6 illustrates a flowchart of another example method for determining which items should be temporally advanced in the pick schedule. In various embodiments, the illustrated method may be another technique for implementing block 310 described above. Note that the description of FIG. 6 is provided within the context of FIG. 3. More specifically, references to the given time period may refer to whichever time period of the picking schedule is currently being evaluated in blocks 306-314. While the illustrated method is described as being performed by the pick scheduling component described herein, the method may be implemented by other components or devices in various embodiments.

As illustrated by block 602, the method may include the pick scheduler evaluating items of a time period subsequent to the given time period to identify one or more candidate items that are candidates to be temporally advanced in the picking schedule. This portion of the method may be similar to block 402 of FIG. 4, described above.

As illustrated by block 604, the method may also include the pick scheduler, for each of multiple candidate items, determining that temporally advancing the picking of that item to the given time period is expected to result in a shipping cost savings. In one example, temporally advancing the picking of an item may enable that item to be shipped via an earlier carrier pull. For example, if an item is picked earlier, it may be prepared for shipment earlier. By being prepared for shipment earlier than originally expected, the item may be able to be shipped via a less costly shipping method. Consider an example where a customer orders an item to be shipped with a two-day delivery method. In various embodiments, if a given candidate item were to be shipped as originally scheduled based on the candidate item's expected ship deadline, the candidate item may be designated to be shipped according to a particular shipment method (e.g., a two-day air service). In this example, the pick scheduler may determine that temporally advancing the picking of the item may cause the item to be prepared for shipment at an earlier time, which would also enable the particular shipment method (two-day air service in this example) to be downgraded to a less costly shipment method (e.g., a ground shipment method) while still meeting the expected delivery date for that item.

As illustrated by block 606, the method may also include the pick scheduler, in response to determining that the shipping cost savings associated with a particular candidate item is greater than the shipping cost savings associated with another candidate item, temporally advancing the particular candidate item to the given time period from a subsequent time period in the picking schedule. For example, if advancing the picking of a first candidate item would result in $1.00 reduction in shipping costs and advancing the picking of a second candidate item would result in no reduction in shipping costs or a reduction less than $1.00, the pick scheduler may determine that the first candidate item should be temporally advanced in the picking schedule. In cases where the capacity (e.g., available labor) of the materials handling facility is capable of processing both of the candidate items, the pick scheduler may forgo the above-described analysis and instead temporally advance both items in the picking schedule, in some embodiments.

Figure 7:
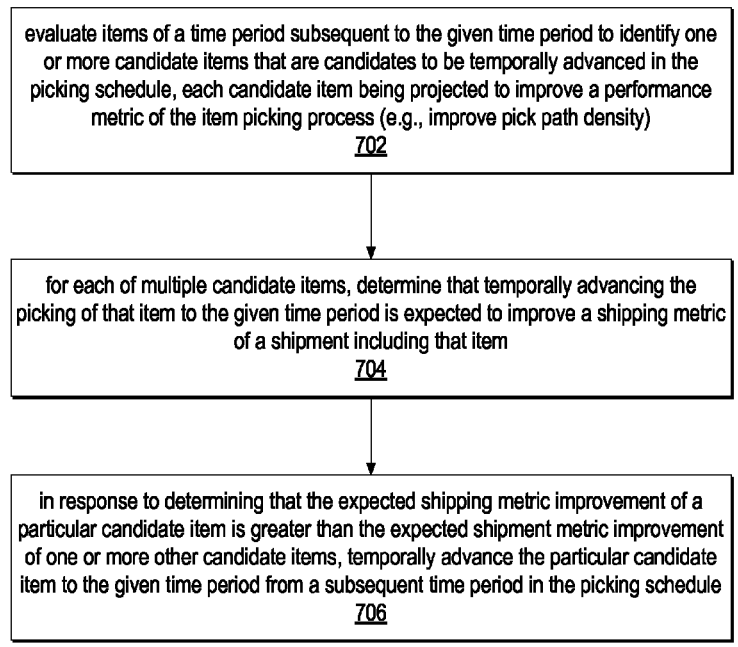
FIG. 7 illustrates a flowchart of another example method for selectively advancing items in an item picking schedule, according to some embodiments.

FIG. 7 illustrates a flowchart of another example method for determining which items should be temporally advanced in the picking schedule. In various embodiments, the illustrated method may be another technique for implementing block 310 described above. Note that the description of FIG. 7 is provided within the context of FIG. 3. More specifically, references to the given time period may refer to whichever time period of the picking schedule is currently being evaluated in blocks 306-314. While the illustrated method is described as being performed by the pick scheduling component described herein, the method may be implemented by other components or devices in various embodiments.

In the example method of FIG. 4, candidate items may be evaluated on the basis of delivery time (e.g., whether or not temporally advancing a given candidate will result in an expedited delivery). In the example method of FIG. 6, candidate items may be evaluated on the basis of shipping cost savings (e.g., whether or not temporally advancing a given candidate item will decrease shipping costs for the shipment including that item). In the illustrated embodiment of FIG. 7, a more generalized method is illustrated in which candidate items may be evaluated on impact to shipment delivery time (e.g., FIG. 4), shipment cost savings (e.g., FIG. 6), some other metric associated with shipping a candidate item, or some combination thereof.

As illustrated by block 702, the method may include the pick scheduler evaluating items of a time period subsequent to the given time period to identify one or more candidate items that are candidates to be temporally advanced in the picking schedule. This portion of the method may be similar to block 402 of FIG. 4, described above.

As illustrated by block 704, the method may include the pick scheduler, for each of multiple candidate items, determining that temporally advancing the picking of that item to the given time period is expected to improve a shipping metric of a shipment including that item. In one example, such shipping metric may be indicative of the shipment delivery time of a shipment including the item. In this case, determining that temporally advancing the picking of the item to the given time period is expected to improve the shipment metric may include determining that the delivery of the shipment is expected to be expedited. Such determination may include utilizing the techniques described above with respect to FIG. 4. In another example, the shipping metric may be indicative of the cost of shipping a shipment including the item. In this case, determining that temporally advancing the picking of the item to the given time period is expected to improve the shipment metric may include determining that temporally advancing the picking of the item would result in a reduced cost associated with shipping a shipment including the item. This determination may include utilizing the techniques described above with respect to FIG. 6. In yet other cases, a shipment metric may include some combination of delivery time and shipment cost. For instance, in one example the pick scheduler may determine a shipment metric for a candidate item as being a weighted sum of the delivery time, shipping cost and/or one or more other criteria. Examples of the other criteria may include a determination as to whether a candidate item is designated as a replacement item. For instance, some candidate items may be designated to be picked in order to replace a previously picked item that has gone missing during a downstream process (e.g., sorting, packing, gift wrapping, etc.). In one example, a candidate item's status as a replacement item may be an additional component of a derived shipping metric (which may also depend on the delivery time and/or shipping cost).

As illustrated by block 706, the pick scheduler, in response to determining that the expected shipping metric improvement of a particular candidate item is greater than the expected shipment metric improvement of one or more other candidate items, may generate an instruction to pick the particular candidate item during the given time period. For instance, the pick scheduler may compare the degree to which each candidate item, if temporally advanced in the picking schedule, would improve a respective shipping metric. In this example, the pick scheduler may select the candidate item that results in the largest improvement to the shipping metric (e.g., largest improvement to shipment delivery time, shipping cost, or some combination thereof) and temporally advance that candidate item in the shipping schedule.

Additional Embodiments

In the various embodiments described herein, a number of items that are candidates to be temporally advanced in the picking schedule are described. In many cases, such candidate items may be items that improve a performance metric of the item picking process. In some cases, the pick scheduler component may designate one or more items as candidate items to be temporally advanced in the picking schedule even in cases where such items do not improve (and may even diminish) a performance metric of the item picking process. Consider item 570 of FIG. 5 as one example. As described above, item 570, if picked along with items 550-556, would negatively impact pick path density. In other words, the pick path density of projected pick path 540 is less than the pick path density of initial pick path 520. However, in some embodiments, the pick scheduler component may determine that the picking of item 570 should be advanced in the picking schedule if the picking of that item would not cost more than a specified amount (provided that advancing the picking of that item would either expedite delivery of the item or result in a shipping cost savings, as is the case with item 570). For example, the pick scheduler may be equipped with a configurable setting for specifying a cost allowance for temporally advancing the picking of items that would either expedite delivery of the item or result in a shipping cost savings. For instance, in various embodiments, the pick scheduler component may incur a small labor cost to pick an item (to be no larger than the configurable cost allowance) in order to improve the customer experience by expediting delivery of the item. In another example, the picking scheduler may incur a small picking cost in order to acquire a larger shipping cost savings. For instance, if picking item 570 would cost $0.10 in additional labor while at the same time enabling the item to be shipped by a less costly shipment method that results in a savings of $0.80 (e.g., a downgrade from two-day air shipping to ground shipping), the pick scheduler component may temporally advance the picking of item 570 in the picking schedule.

In some embodiments, the quantity of labor available during a given time period may not be sufficient to pick all items initially scheduled to be picked during that time period. In these instances, the pick scheduler described herein may be configured to temporally delay the picking of some items utilizing logic similar to that described above. For instance, the pick scheduler may determine that the materials handling facility is capable of processing 10,000 items during a particular time period. In an example where 12,000 items are initially scheduled to be picked during that particular time period, the pick scheduler may be configured to selectively delay 2,000 items (i.e., the difference between the quantity of items initially scheduled to be picked and the processing capability of the materials handling facility for that time period) to a subsequent time period in the picking schedule. In various embodiments, such items may be temporally delayed based on impact to shipment delivery time and/or transportation costs.

Example Computer System

Various embodiments of a system and method for selectively advancing items in a picking schedule, as described herein, may be executed on one or more computer systems, which may interact with various other devices. Note that any component or action described above with respect to FIGS. 1-6 may be implemented via one or more computer systems configured as computer system 900 of FIG. 8, according to various embodiments. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some cases, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store program instructions 922 and/or data 932 accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions 922 implementing pick scheduler component 100 (configured as described above) are shown stored within system memory 920. Additionally, data 932 of memory 920 may store any of the data (e.g., inventory model 130, facility map 140, pick lists/paths, etc.) described above, in some embodiments. In some embodiments, program instructions and/or data may be received, sent or stored upon different types of computer-accessible media or on similar media separate from system memory 920 or computer system 900.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 (which may implement pick scheduler component 100) and other devices (e.g., control system 110, agent components 120, data stores storing inventory model 130 or facility map 140, etc.) attached to a network 985 or between nodes of computer system 900. Note that any of such devices may also be implemented by a computer system similar to computer system 900. Network 985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol. Any of the computer systems, devices, component or elements described herein may communicate via such networks.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

As shown in FIG. 8, memory 920 may include program instructions 922 configured to implement any element or action described above. In one embodiment, the program instructions may implement the methods described above, such as the methods described above with respect to FIG. 3, FIG. 4 and FIG. 6. In other embodiments, different elements and data may be included. Note that data 932 may include any data described above with respect to FIGS. 1-6.

Those skilled in the art will appreciate that computer system 900 is merely illustrative and is not intended to limit the scope of embodiments. In particular, the computer system and devices may include any combination of hardware or software that can perform the indicated functions, including computers (e.g., notebooks, desktops, netbooks, handhelds, etc.), network devices, Internet appliances, set top boxes, PDAs, wireless phones, smartphones, touchscreen devices, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally, a computer-accessible medium may include a computer-accessible storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A system, comprising:
   a memory; and
   one or more processors coupled to the memory, wherein the memory comprises program instructions executable by the one or more processors to implement a pick scheduler component configured to:
      determine that a quantity of available labor is greater than a quantity of labor needed to perform an item picking process that includes picking a plurality of items from respective locations of a materials handling facility, wherein the plurality of items are scheduled to be picked during a particular time period of a picking schedule;
      in response to that determination, evaluate multiple items that are not scheduled to be picked during the particular time period in order to identify candidate items that are candidates to be picked during said particular time period, wherein picking a given candidate item during said particular time period is projected to improve one or more performance metrics of said item picking process;
      for each of multiple candidate items, determine that temporally advancing the picking of that item to the particular time period is expected to improve a shipping metric of a shipment including that item; and
      in response to determining that the expected shipping metric improvement of a particular candidate item is greater than the expected shipment metric improvement of one or more other candidate items, generate an instruction to pick the particular candidate item during the particular time period.

2. The system of claim 1, wherein one or more of the shipping metrics are based on at least one of: a shipment delivery time of the respective shipment or a cost of shipping the respective shipment.

3. The system of claim 1, wherein to generate an instruction to pick the particular candidate item during the particular time period, the pick scheduler component is configured to generate data indicating a pick path of multiple items to be picked from an inventory storage area of the materials handling facility, wherein the multiple items of the pick path include said particular candidate item.

4. The system of claim 3, wherein the pick scheduler component is configured to provide the pick path data to a mobile communication device associated with an agent tasked with traversing the pick path.

5. The system of claim 1, wherein at least one of said one or more performance metrics comprises a pick density metric, wherein the pick density metric is a metric based on a ratio of quantity of pick path items to a length of the pick path.

6. The system of claim 5, wherein the length of the pick path is measured in one of: units of time or units of distance.

7. The system of claim 1, wherein the pick scheduler component is configured to, for at least one item that is not scheduled to be picked during the particular time period:
   determine that temporally advancing the picking of that item to the particular time period would diminish a performance metric of the item picking process; and
   in response to determining that temporally advancing the picking of that item is expected to improve a shipment metric of a shipment including that item, temporally advance the picking of that item to the particular time period from a subsequent time period in the picking schedule.

8. The system of claim 7, wherein the performance metric that would be diminished includes a pick density metric of a pick path including multiple items to be picked, wherein the pick density is a metric based on a ratio of quantity of pick path items to a length of the pick path.

9. A computer-implemented method, comprising:
   determining that a quantity of available labor is greater than a quantity of labor needed to perform an item picking process that includes picking a plurality of items from respective locations of a materials handling facility, wherein the plurality of items are scheduled to be picked during a particular time period of a picking schedule;
   in response to that determination, evaluating multiple items that are not scheduled to be picked during the particular time period in order to identify candidate items that are candidates to be picked during said particular time period, wherein picking a given candidate item during said particular time period is projected to improve one or more performance metrics of said item picking process;
   for each of multiple candidate items, determining, by a computer system, that temporally advancing the picking of that item to the particular time period is expected to improve a shipping metric of a shipment including that item; and
   in response to determining that the expected shipping metric improvement of a particular candidate item is greater than the expected shipment metric improvement of one or more other candidate items, generating, by the computer system, an instruction to pick the particular candidate item during the particular time period.

10. The computer-implemented method of claim 9, wherein one or more of the shipping metrics are based on at least one of: a shipment delivery time of the respective shipment or a cost of shipping the respective shipment.

11. The computer-implemented method of claim 9, wherein generating an instruction to pick the particular candidate item during the particular time period comprises generating data indicating a pick path of multiple items to be picked from an inventory storage area of the materials handling facility, wherein the multiple items of the pick path include said particular candidate item.

12. The computer-implemented method of claim 11, wherein the method comprises providing the pick path data to a mobile communication device associated with an agent tasked with traversing the pick path.

13. The computer-implemented method of claim 9, wherein at least one of said one or more performance metrics comprises a pick density metric, wherein the pick density metric is a metric based on a ratio of quantity of pick path items to a length of the pick path.

14. The computer-implemented method of claim 13, wherein the length of the pick path is measured in one of: units of time or units of distance.

15. The computer-implemented method of claim 9, wherein the method comprises, for at least one item that is not scheduled to be picked during the particular time period:
    determining that temporally advancing the picking of that item to the particular time period would diminish a performance metric of the item picking process; and
    in response to determining that temporally advancing the picking of that item is expected to improve a shipment metric of a shipment including that item, temporally advancing the picking of that item to the particular time period from a subsequent time period in the picking schedule.

16. The computer-implemented method of claim 15, wherein the performance metric that would be diminished includes a pick density metric of a pick path including multiple items to be picked, wherein the pick density is a metric based on a ratio of quantity of pick path items to a length of the pick path.

17. A non-transitory computer-readable storage medium, storing program instructions computer-executable on a computer system to implement a pick scheduler component configured to perform a method comprising:
    determining that a quantity of available labor is greater than a quantity of labor needed to perform an item picking process that includes picking a plurality of items from respective locations of a materials handling facility, wherein the plurality of items are scheduled to be picked during a particular time period of a picking schedule;
    in response to said determining, evaluating multiple items that are not scheduled to be picked during the particular time period in order to identify candidate items that are candidates to be picked during said particular time period, wherein picking a given candidate item during said particular time period is projected to improve one or more performance metrics of said item picking process;
    for each of multiple candidate items, determining that temporally advancing the picking of that item to the particular time period is expected to improve a shipping metric of a shipment including that item; and
    in response to determining that the expected shipping metric improvement of a particular candidate item is greater than the expected shipment metric improvement of one or more other candidate items, generating an instruction to pick the particular candidate item during the particular time period.

18. The non-transitory computer-readable storage medium of claim 17, wherein one or more of the shipping metrics are based on at least one of: a shipment delivery time of the respective shipment or a cost of shipping the respective shipment.

19. The non-transitory computer-readable storage medium of claim 17, wherein to generate an instruction to pick the particular candidate item during the particular time period, the pick scheduler component is configured to generate data indicating a pick path of multiple items to be picked from an inventory storage area of the materials handling facility, wherein the multiple items of the pick path include said particular candidate item.

20. The non-transitory computer-readable storage medium of claim 19, wherein the pick scheduler component is configured to provide the pick path data to a mobile communication device associated with an agent tasked with traversing the pick path.

21. The non-transitory computer-readable storage medium of claim 17, wherein at least one of said one or more performance metrics comprises a pick density metric, wherein the pick density metric is a metric based on a ratio of quantity of pick path items to a length of the pick path.

22. The non-transitory computer-readable storage medium of claim 21, wherein the length of the pick path is measured in one of: units of time or units of distance.

23. The non-transitory computer-readable storage medium of claim 17, wherein the pick scheduler component is configured to, for at least one item that is not scheduled to be picked during the particular time period:
    determine that temporally advancing the picking of that item to the particular time period would diminish a performance metric of the item picking process; and
    in response to determining that temporally advancing the picking of that item is expected to improve a shipment metric of a shipment including that item, temporally advance the picking of that item to the particular time period from a subsequent time period in the picking schedule.

24. The non-transitory computer-readable storage medium of claim 23, wherein the performance metric that would be diminished includes a pick density metric of a pick path including multiple items to be picked, wherein the pick density is a metric based on a ratio of quantity of pick path items to a length of the pick path.

* * * * *